Aug. 25, 1970

B. M. KOCATAS 3,525,252

FLUID MATERIAL MEASUREMENT APPARATUS

Filed Jan. 3, 1969

INVENTOR
BABUR M. KOCATAS
BY Harold R. Patton
ATTORNEY

INVENTOR
BABUR M. KOCATAS
BY Harold J. Fallon
ATTORNEY

United States Patent Office 3,525,252
Patented Aug. 25, 1970

3,525,252
FLUID MATERIAL MEASUREMENT APPARATUS
Babur M. Kocatas, St. Louis, Mo., assignor to Monsanto Company, St. Louis, Mo., a corporation of Delaware
Filed Jan. 3, 1969, Ser. No. 790,193
Int. Cl. G01n 11/00
U.S. Cl. 73—54                                       7 Claims

ABSTRACT OF THE DISCLOSURE

Measuring apparatus for monitoring the physical characteristics of fluid materials including a sensor assembly supported at a pivot point between its sensor and actuator ends. The sensor end is adapted to be inserted in a material, the physical characteristics of which are to be monitored, and the actuator end is periodically moved from an initial position by the energization of a solenoid. The movement takes place in opposition to a spring force applied to the actuator end and urging it back toward the initial position when the solenoid is turned off. Resistance to the return force corresponds to instantaneous physical characteristics of the material. Such resistance is amplified and transmitted by the sensor assembly to a magnetic pickup coil, where an electrical signal indicative of the magnitude of the resistance is generated.

FIELD OF THE INVENTION

The present invention relates generally to apparatus for monitoring physical characteristics of fluid materials, and more particularly, to electro-mechanical measuring apparatus for sensing dynamic changes in the stiffness, elasticity, viscosity, density, surface tension, and like parameters, of fluid materials, and resulting from environmental changes, such as pressure, temperature, aging, and the like.

BACKGROUND OF THE INVENTION

In the field dealing with the measurement of material physical characteristics, such as those mentioned above, it is difficult to obtain accurate "real-time" measurements of changes as they take place. For example, instead of attempting to measure the changes of rubbery polymeric materials or plastic materials as they are cured and/or molded, it is common practice to subject test samples of designed conditions in a precisely controlled environment (laboratory) and evaluate the data attained thereby. This data is then extrapolated into parameters used to control production curing or molding processes. Oftentimes, the production conditions and environment cannot be as precisely controlled as the laboratory environment. Therefore, the extrapolated parameters applied to control the production processes result in unexpected and undesirable results, with accompanying loss in time and materials. Therefore, it is highly desirable to be able to monitor and measure the physical characteristics of materials, such as those described hereinabove, during actual production curing or molding processes.

DESCRIPTION OF THE PRIOR ART

Heretofore, one conventional method of determining physical characteristics of fluid materials has been to subject material samples to laboratory-type shearing or other stress test conditions (see for example U.S. Pats. 2,904,- 994 and 3,182,494 to Claston and Beatty et al.). Although the data obtained in such laboratory test samples has been found to be useful in many cases, it has not been found to prove satisfactory where unpredictable variations in production parameters occur during the production process. In addition, when the composition of the source material used in a given production process is changed, it becomes necessary to repeat the sample testing and extrapolation exercise to develop new production process data. Furthermore, most laboratory-type tests are destructive in nature, i.e. the test samples are not usable after the tests are completed. For these reasons, prior physical characteristic measurement apparatus has resulted in substantial effort in terms of time, testing materials, and testing facilities.

SUMMARY OF THE INVENTION

The general purpose of this invention is to provide apparatus for monitoring and/or measuring the physical characteristics of fluid materials which embraces all of the advantages of similarly employed apparatus, yet does not possess the aforedescribed disadvantages. To attain this, the present invention utilizes a unique sensor assembly, in combination with actuation and sensing apparatus which can be employed to make real-time measurements.

An object of the present invention is the provision of novel measurement apparatus capable of continuously monitoring changing physical characteristics of fluid materials.

Another object is to provide fluid material monitoring apparatus which provides an accurate indication of physical changes in such material, yet affords non-destructive type monitoring.

Still another object of the invention is to provide an electro-mechanical instrument for providing an electrical signal which may be readily calibrated to correspond to physical characteristics of materials measured thereby.

BRIEF DESCRIPTION OF THE INVENTION

In the present invention these purposes (as well as others apparent herein) are achieved generally by providing a rod-like sensor assembly having a sensor end and an actuator end, the sensor end being adapted for insertion in a fluid material whose physical characteristics are to be monitored. The sensor assembly is flexibly supported between its ends and is free to pivot about its support in response to forces applied to it. An actuator device is coupled to the actuator end of the sensor assembly, to impart an actuating force which pivotably moves the sensor assembly. Such movement takes place in opposition to a force applied to the sensor assembly by means of a repeatable force device or mechanism. When the actuating force is removed from the sensor assembly, a sensing device detects the resistance imparted to the sensor assembly by the fluid material, as it is returned from its actuated-position by the repeatable force device. The sensing device provides an electrical signal which can be calibrated to correspond to physical characteristics of the fluid material being monitored.

BRIEF DESCRIPTION OF THE INVENTION

Utilization of the invention will become apparent to those skilled in the art from the disclosure made in the following description of a preferred embodiment of the invention, as illustrated in the accompanying drawings, in which.

DESCRIPTION OF PREFERRED EMBODIMENTS OF THE INVENTION

Figure 1:
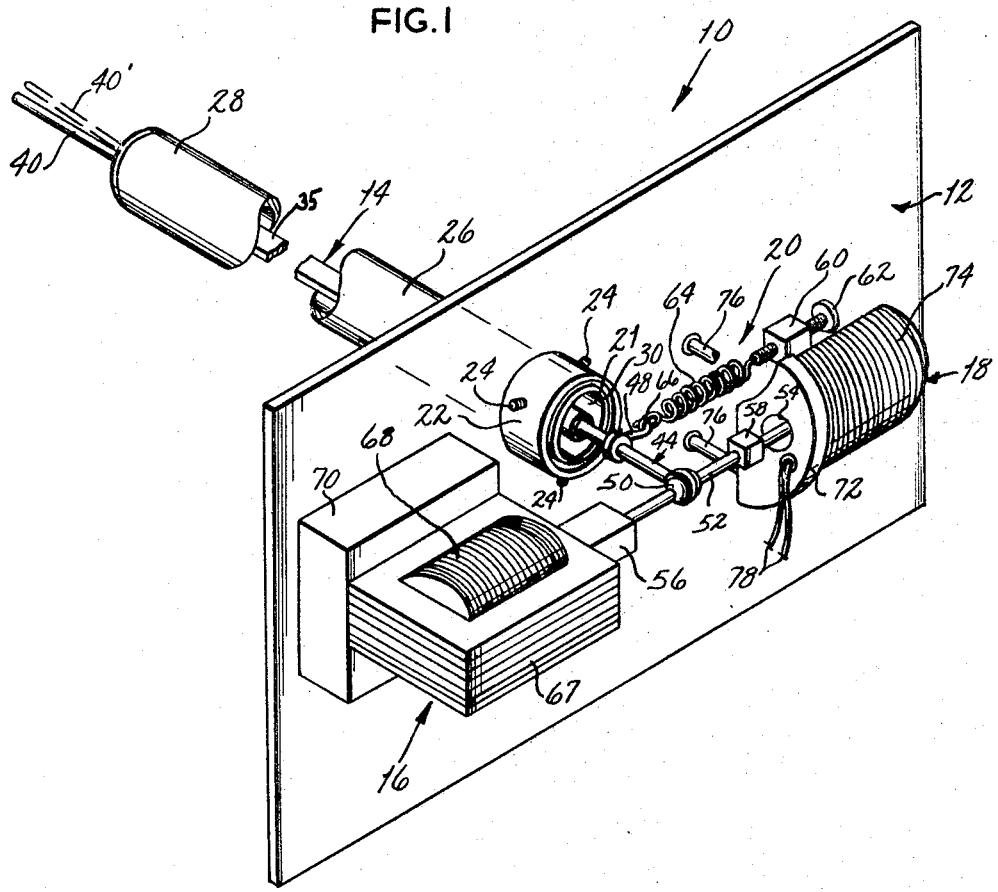
FIG. 1 is a perspective view of the measurement apparatus of the present invention, including broken away portions to reveal interior details.

Referring now to the drawings, wherein like reference characters designate like or corresponding parts throughout the several views, there is shown in FIG. 1 my measurement apparatus, generally designated 10. The measurement apparatus includes a mounting bracket or flat plate 12, a sensor assembly 14, an actuator device 16, a sensing device 18, and a repeatable-force device 20.

The mounting plate 12 has formed integrally therewith an aperture 21 and a mounting ring 22 which extends forwardly therefrom. The mounting ring 22 is fitted with four space-apart set screws 24, which extend through the ring 22 to contact a tubular member 26. The tubular member 26 extends longitudinally from its open forward end 30 through the mounting frame 22, to terminate in a closed end 28 spaced from the mounting plate 12.

Figure 2:
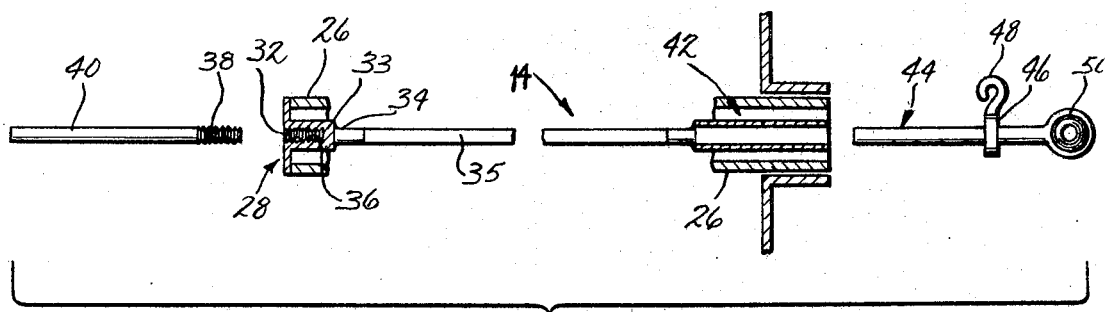
FIG. 2 is an enlarged, exploded cross-sectional view of the sensor-assembly of the measuring apparatus of FIG. 1.

As may be seen in FIG. 2, the tubular member 26 is closed at its far end 28 by a flexible disc 32 which forms a portion of the sensor assembly 14. The flexible disc 32 includes a central support portion 33 which is welded at 34 to a knife-blade, force-transmitting portion 35 of the sensor assembly 14. The disc 32 is further welded to the tubular member 26 along its peripheral outer edges, thereby to centrally support the sensor assembly 14 within the tubular member 26.

It may be seen that the flexible disc 32 not only serves to support the sensor assembly 14 within the tubular member 26, but it also seals the far end 28 of the tube 26, thereby to isolate the interior of the tubular member 26 from the environment in which a sensor probe 40 of the sensor assembly 14 may be inserted. For example, if the sensor probe 40 is inserted within a mold for curing rubbery polymeric or plastic materials, the disc 32 serves both as a support (about which the sensor assembly may pivot) and as a seal. The central support portion 33 of the disc 32 is provided with an internally-threaded hole 36, adapted to receive the threaded portion 38 of the sensor probe 40. Thus, the probe 40 may be readily removed from the sensor assembly 14 for cleaning, replacement, or substitution by a probe having a different shape.

Figure 5A:
FIGS. 5a–5e are cross-sectional views of alternative force-transmitting portions of the sensor assembly.

The force-transmitting portion 35 of the sensor assembly 14 extends between the disc 32 and a receiving chamber 42. As will be described more fully hereinafter, the sensor assembly 14 is reciprocated in operation, and the preferred knife-blade shape of its force-transmitting portion 35 permits transfer of forces from the sensor probe 40 to the actuator end of the sensor assembly 14 with a minimum amount of deflection. That is, the longer dimension of the force-transmitting portion 35 of the assembly 14 lies in the plane of the applied actuation force and the resulting reaction force. The force-transmitting portion 35 may be a solid metal member or a tubular member, as shown in FIG. 5a.

Figure 5B:
Figure 5C:
Figure 5D:
Figure 5E:

If desired, the cross-sectional shape of the force-transmitting portion 35 of the sensor assembly 14 may take other forms, such as those illustrated in FIGS. 5b–5e. In FIG. 5b solid and tubular elliptical cross-sections are shown; in FIG. 5c solid and tubular square cross-sections are shown, in FIG. 5d solid and tubular circular cross-sections are shown, and in FIG. 5e I-beam cross-sections are shown. It should be apparent to those skilled in the art that other cross-sectional configurations and shapes may be chosen for the force-transmitting portion 35 of the sensor assembly 14.

The receiving chamber 42 of the sensor assembly 14 is fitted with an extender arm 44 having a collar 46 provided with a ring-receiving hook 48. In addition, the extender arm 44 is provided with a ball-receiving ring 50 adapted to receive a universal ball joint provided on the rod 52. The rod 52 extends perpendicular to the extender arm 44. One end of the rod 52 is provided with a soft iron slug 58 which is aligned with and free to move in and out of an opening 54 provided in the sensing device 18. The other end of the rod 52 is provided with another soft iron slug 56, which is aligned with and free to move in and out of an opening (not shown) provided within the actuator device 16.

The return-force device 20 for the sensor assembly 14 includes a metal block 60 secured to the mounting plate 12, an adjustable screw 62, and a spring member 64. The screw passes through the metal block 60 and is secured to one end of the spring member 64. The other end of the spring member 64 is provided with a ring 66 arranged to engage the ring-receiving hook 48 provided on the collar 46 of the extender arm 44.

Preferably the actuator device 16 is a solenoid consisting of a laminated iron portion 67 surrounding an electrical coil portion 68. The solenoid is secured to a block 70, which in turn is fastened to the mounting plate 12 by fastening means (not shown).

The preferred sensing device 18 shown in FIG. 1 takes the form of a magnetic pick-up consisting of a permanent magnet 72, an electrical coil 74, and output leads 78. The sensing device 18 is bolted to the mounting plate 12 by means of bolts 76.

OPERATION OF MEASURING APPARATUS 10

In operation, the sensor probe 40 of the sensor assembly 14 is placed in direct contact with the material whose physical characteristics are to be monitored. For example, if the curing of a tire is to be monitored, the tubular member 28 is inserted through an opening in the mold steam jacket with the probe 40 contacting the rubber composition to be cured within the tire mold. The flexible disc 32 seals the interior of the tubular member 26, so that changing conditions (temperature and pressure) within the mold do not interfere with the operation of the measurement apparatus 10. After the sensor probe 40 has been placed in contact with the fluid material, the mounting frame 12 is moved into position with the open end of the tubular member 26 extending into the aperture 21. The extender arm 44 is guided into the receiving chamber 42 of the sensor assembly 14 during this positioning operation. Then the set screws 24 are tightened to securely hold the sensor assembly and plate mounted devices in position.

The solenoid-actuator device 16 is then energized by connecting its coil 68 to an energizing circuit, such as an oscillator circuit (not shown). The oscillator circuit may be designed to provide actuating signals to the solenoid at a predetermined frequency. It has been found that energizing signals having a frequency of two or three per second is satisfactory for many applications of the measurement apparatus 10. However, it should be understood that greater or lesser pulse frequencies may be employed.

Energization of the solenoid-actuator device 16 causes the soft iron slug 56 and the rod 52 to move from its initial position toward the solenoid-actuator device 16 (the movement is to the left as viewed in FIG. 1). This movement takes place against the resistance offered by the spring member 64 of the return-force device 20 and continues until the extender arm and sensor assembly 14 assumes an actuated position. The actuating movement and force is transmitted by means of the sensor assembly 14 through the flexible disc 32, to the sensor probe 40. The sensor assembly 14 pivots about the axis of the disc 32, causing the sensor probe 40 to move to the position indicated by the dashed lines 40' in FIG. 1. Inasmuch as the sensor probe 40 is shorter than the remainder of the sensor assembly 14, the movement at its tip is less than that at the actuator end of the sensor assembly 14.

Figure 7:
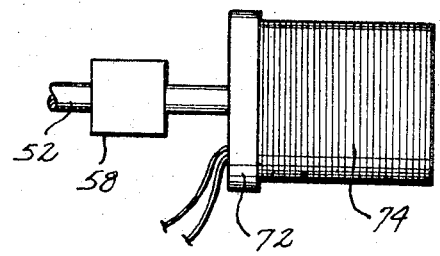
FIG. 7 is a detailed view of the sensing device of the measuring apparatus of FIG. 1.

When the solenoid-actuator device 16 is deenergized, the extender arm 44 and sensor assembly 14 is urged toward the initial position by the spring member 64. This causes the iron slug 58 on the rod 52 to move to the right as viewed in FIGS. 1 and 7. Such movement of the iron slug 58 influences a change in the magnetic field established by the permanent magnet 72, thereby causing magnetic flux lines to cut the pick-up coil 74 of the sensing device 18. This results in the generation of an electrical signal which is transmitted by the signal leads 78 to appropriate detection circuitry for measuring the magnitude or general waveform of the generated signal.

The return of the sensor assembly 14 toward its reference or initial position is influenced by the spring member 64 as described above. In addition, it is impeded by the resistance applied to the probe member 40 by the fluid material to be measured. For example, the resistance to the movement of the probe member 40 will be greater after a rubbery polymeric material has been cured for a given time period than before any curing takes place. Thus, the rate of return or velocity achieved by the iron slug 58 of the rod 52 will correspond to the drag or stiffness of the material in which the sensor probe 40 has been inserted. The electrical signal generated will in turn correspond to the rate of change of the magnetic field at the sensing device and can be calibrated to correspond to the stiffness, drag, or other physical characteristics of the fluid material being monitored.

The output signal occurring at the signal leads 78 will be an A.C. signal which can be rectified by a conventional halfway rectifier circuit to blank-out or remove that portion of the actuator signal which corresponds to the actuator movement of rod 52 and assembly 14. In this manner, the resulting rectified signal corresponds to the drag or resistance imparted by the material to the sensor assembly 14 as it is returned from its actuated position toward its initial position under the influence of the repeatable force of the spring member 64. That is, the magnitude of the resulting D.C. signal corresponds at any instant of time to the resistance or drag of the fluid material being measured, and may be used to drive meters or recorders or activate indicator lights or alarms at preset levels.

Figure 3A:
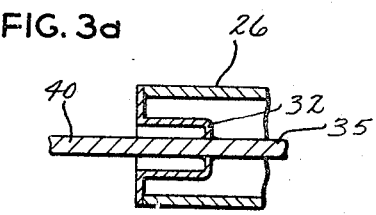
FIGS. 3a–3d are enlarged, partial cross-sectional views of alternative flexible supports for the sensor assembly of FIG. 2.
Figure 4A:
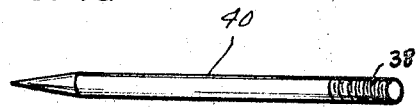
FIGS. 4a–4d are perspective views of alternating sensor probes for use with the measuring apparatus of FIG. 1.
Figure 3B:
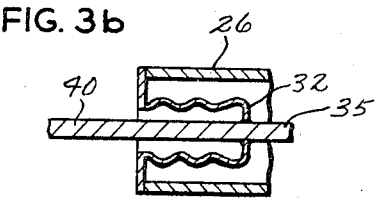
Figure 3C:
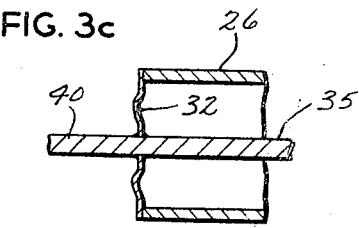
Figure 3D:
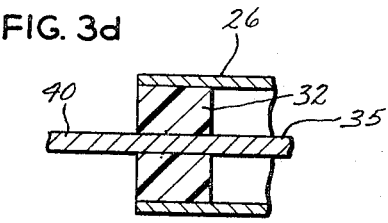
Figure 4D:

In FIGS. 3a–3b there are shown alternative flexible discs 32 for supporting the sensor assembly 14 in the tubular member 26. In FIG. 3a the disc takes the form of a flexure tube 78 having portions concentric with the force-transmitting portions of the sensor assembly 14 and the tubular member 26. In FIG. 3b a somewhat similar flexure tube is shown, except the tubular walls are rippled or bellowed. In FIG. 3c the flexible disc 32 is shown as a thin-walled flat diaphragm and in FIG. 3d it is shown as a flexible, plastic or elastomer cylinder.

Figure 4B:
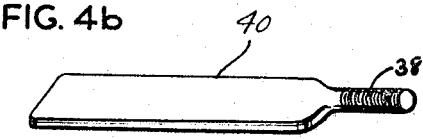
Figure 4C:
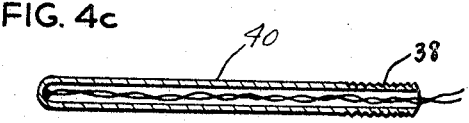

Alternative disengagable sensor probes 40 are shown in FIGS. 4a–4d. The probe of FIG. 4a has a pointed tip and is particularly suited for insertion in relatively stiff, rubbery polymeric materials. The sensor probe 40 of FIG. 4b is shaped in the form of a flat paddle, whereas the probe 40 of FIG. 4d has fluted or grooved portions covering its outer surface. The sensor probe of FIG. 4c is tubular and is shown with a temperature sensor, such as a thermocouple, mounted within it. It should be apparent that the sensor probe 40 of FIG. 4c could be used in the manner described with reference to the other sensor probes described herein, and further provide temperature readings of the fluid material being monitored.

Figure 6:
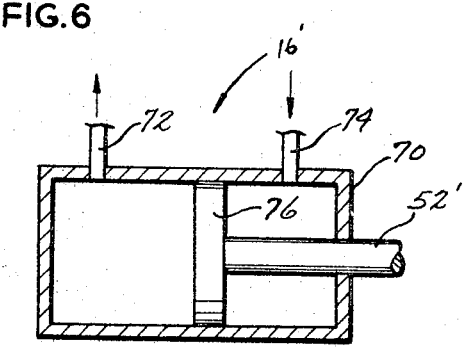
FIG. 6 is a cross-sectional view of an alternative actuator device for use with the measurement apparatus of FIG. 1.

In FIG. 6 there is shown an alternative actuator device 16'. In the actuator device 16' is a cylinder 70 having an inlet 72 and an outlet 74. The inlet and outlet 72 and 74 may be connected to an appropriate pressure source and valves for applying an actuation pressure to one side or the other of a piston 76 slidably mounted within the cylinder 70. A piston rod 52' is secured to the piston 76 and extends through the cylinder wall. The piston rod 52' corresponds to the rod 52 of the measuring apparatus 10 of FIG. 1. In operation the piston 76 may be actuated in a manner similar to that of the actuation of the solenoid device 16 to move the sensor assembly 14 to its actuated position. It should be apparent to those skilled in the art, that other actuating mechanisms may be employed. For examaple, conventional camming or eccentric mechanisms could be employed to move the sensor assembly to its actuator position.

In addition, other conventional return-force devices equivalent to return-force device 20 could be employed in practicing the present invention. For example, pneumatic or electromagnetic devices could be adapted to the ring-receiving hook 48 of the sensor assembly 14 to return the sensor assembly 14 from its actuator position toward its initial or rest position. Furthermore, a simple weight and pulley mechanism could be employed, thereby allowing gravity to exert the return force on the sensor assembly 14.

Many modifications and variations of the present invention are possible in view of the above teachings. For example, it has been found that in monitoring certain adhesive materials, it is advantageous to detect the time delay occurring between the time the actuator device is deenergized and the time that the sensor assembly 14 begins to move toward its initial position. This time delay, and the dampening action of the material on the return movement of sensor assembly 14 may be observed simultaneously on an oscilloscope or similar display device to provide a composite display which is characteristic of the physical properties of the material being monitored. Therefore, it is to be understood that the invention may be practiced otherwise than as specifically described.

I claim:

1. Apparatus for monitoring physical characteristics of fluid materials and the like, comprising
    a rod-like member having a sensor end and an actuator end, said sensor end being adapted for insertion in such fluid materials,
    means mechanically connected to said rod-like member for supporting said member between its sensor and actuator ends and in a reference position,
    means coupled to said actuator end of said member for selectively imparting an actuating force to move said member from said reference position and about a pivot point defined by said support means,
    means independent of said support means mechanically coupled to said actuator end of said member and imparting a return force to urge said member toward said reference position, and
    means coupled to said actuator end of said member for producing an electrical signal corresponding to the resistance imparted to said member at its sensor end by such fluid materials and transmitted to its actuator end as it is urged from its actuated position toward said reference position.

2. Apparatus for monitoring physical characteristics of fluid materials and the like, comprising
    a rod-like having a sensor end and an actuator end, said sensor end being adapted for insertion in such fluid materials,
    a tubular member concentric with said rod-like member, said tubular member being open at one end to permit said actuator end of said rod-like member to pass therethrough, and closed at its other end by a flexible diaphragm secured to said tubular member along its outer periphery and to said rod-like member, thereby to support said rod-like member within said tubular member,
    means coupled to said actuator end of said member for selectively imparting an actuator force to move said member from said reference position and about a pivot point defined by said flexible diaphragm,
    means independent of said diaphragm mechanically coupled to said actuator end of said member and imparting a return force to urge said member toward said reference position, and means coupled to said actuator end of said member for producing an electrical signal corresponding to the resistance imparted to said member at its sensor end by said fluid materials and transmitted to its actuator end as it is urged from its actuated position toward said reference position.

3. Apparatus for monitoring physical characteristics of fluid materials and the like, comprising a rod having a sensor end and an actuator end, said sensor end being adapted for insertion in such fluid materials, support means secured to said rod for supporting said rod between its sensor and actuator ends and in a reference position, means coupled to said actuator end of said rod for selectively imparting an actuating force to move said rod from said reference position about a pivot point defined by said support means, means independent of said support means mechanically coupled to said actuator end of said rod for imparting a return force to urge said rod from its actuated position toward said reference position, and means coupled to said actuator end of said rod for sensing the resistance imparted by such material to said rod as it is urged from its actuated position toward said reference position.

4. The monitoring apparatus as defined in claim 3, wherein said sensor end of said rod, comprises
a hollow tube,
and sensor means secured within said hollow tube.

5. Apparatus for monitoring physical characteristics of fluid materials and the like, comprising a rod having a sensor end and an actuator end, said sensor end being adapted for insertion in such fluid materials, support means secured to said rod for supporting said rod between its sensor and actuator ends and in a reference position, a cylinder including inlet and outlet ports, a piston slidably mounted within said cylinder and having a piston rod mechanically coupled to said actuator end of said actuated rod for selectively imparting an actuating force to move said rod from said reference position about a pivot point defined by said support means, means mechanically coupled to said actuator end of said rod for imparting a return force to urge said rod from its actuated position toward said reference position, and means coupled to said actuator end of said rod for sensing the resistance imparted by such material to said rod as it is urged from its actuated position toward said reference position.

6. Apparatus for measuring dynamically changing stiffness characteristics of temperature-cured materials and the like, comprising a rod having a sensor end and an actuator end, said sensor end being adapted for insertion in such fluid materials, means mechanically connected to said rod for supporting said rod between its sensor and actuator ends and defining a pivot point for movement of said rod, means coupled to said actuator end of said rod for selectively imparting an actuating force to move said rod about said pivot point, means independent of said support means mechanically coupled to said actuator end of said rod and imparting a return force to urge rod in the opposite direction to that movement caused by said actuating means, and means coupled to said actuator end of said rod for producing an electrical signal corresponding to the resistance imparted to said rod at its sensor end by such fluid materials and transmitted to its actuator end as said rod is urged in the opposite direction to that caused by said actuating means.

7. Apparatus for monitoring physical characteristics of fluid materials and the like, comprising a sensor assembly including a sensor end and an actuator end, said sensor end being adapted for insertion in such fluid materials, means mechanically coupled to said sensor assembly for supporting same intermediate its sensor and actuator ends, means coupled to said actuator end of said sensor assembly for selectively applying an actuating force to said sensor assembly, thereby to pivot said assembly about its support means, means independent of said support means mechanically coupled to said actuator end of said sensor assembly for applying a return force to urge said sensor assembly in a direction in opposition to that resulting from said actuating force, and means coupled to said actuator end of said sensor assembly for sensing the velocity of said sensor assembly in response to said return force and in the absence of said actuating force.

References Cited

UNITED STATES PATENTS

| | | | |
|---|---|---|---|
| 2,973,639 | 3/1961 | Banks | 73—54 |
| 3,145,559 | 8/1964 | Banks | 73—59 X |
| 3,286,507 | 11/1966 | Moore | 73—54 X |
| 3,349,604 | 10/1967 | Banks | 73—59 X |

S. CLEMENT SWISHER, Primary Examiner

J. W. ROSKOS, Assistant Examiner